(12) United States Patent
Lee

(10) Patent No.: US 7,216,356 B2
(45) Date of Patent: May 8, 2007

(54) MOUNTING STRUCTURE FOR AN OPTICAL DISK INCLUDING A BALL ATTRACTED BY A PREDETERMINED PULLING FORCE INTO A CAVITY TO PRESS AND FASTEN THE OPTICAL DISK TO PREVENT VIBRATING

(75) Inventor: Kuo-Chun Lee, Taoyuan Shien (TW)

(73) Assignee: Benq Corporation, Taoyuan Shien (TW)

( * ) Notice: Subject to any disclaimer, the term of this patent is extended or adjusted under 35 U.S.C. 154(b) by 409 days.

(21) Appl. No.: 10/958,050

(22) Filed: Oct. 4, 2004

(65) Prior Publication Data
US 2005/0076354 A1 Apr. 7, 2005

(30) Foreign Application Priority Data
Oct. 6, 2003 (TW) ............................. 92127721 A

(51) Int. Cl.
*G11B 17/028* (2006.01)
(52) U.S. Cl. ..................................................... 720/708
(58) Field of Classification Search ................. 360/708
See application file for complete search history.

(56) References Cited

U.S. PATENT DOCUMENTS 6,779,192 B2 * 8/2004 Kim et al. ................... 720/708
6,795,388 B1 * 9/2004 Kammerer ............... 369/270.1

* cited by examiner

*Primary Examiner*—A. J. Heinz
(74) *Attorney, Agent, or Firm*—Thomas, Kayden, Horstemeyer & Risley

(57) ABSTRACT

An optical disk drive includes a motor base, a rotating shaft, a rotor and a disk mounting structure. The rotating shaft is rotatably disposed on the motor base. The rotor is disposed on the rotating shaft with part of the rotating shaft protruding from the rotor. The disk mounting structure includes a mounting portion, a fitting portion and a ball. The mounting portion is disposed on the rotating shaft for carrying an optical disk. The fitting portion is disposed on the mounting portion to be buckled into the hole of the optical disk. The lateral surface of the fitting portion has a cavity. The ball is movably disposed inside the cavity and may be pulled or attracted by a predetermined pulling force. When the disk mounting structure rotates, the ball will press the optical disk because the centrifugal force of the ball is larger than the predetermined pulling force.

13 Claims, 4 Drawing Sheets

MOUNTING STRUCTURE FOR AN OPTICAL DISK INCLUDING A BALL ATTRACTED BY A PREDETERMINED PULLING FORCE INTO A CAVITY TO PRESS AND FASTEN THE OPTICAL DISK TO PREVENT VIBRATING

This application claims the benefit of Taiwan application Serial No. 92127721, filed Oct. 6, 2003, the subject matter of which is incorporated herein by reference.

BACKGROUND OF THE INVENTION

1. Field of the Invention

The invention relates in general to an optical disk drive, and more particularly to an optical disk drive having a disk mounting structure for preventing disk vibrating.

2. Description of the Related Art

Along with the rapid advance in science and technology and with the universal popularity in pictures, music, movies and computer software, high-capacity disk has become an important software carriage in modern people's everyday life. Optical disk, which may be classified as CD and DVD, with its advantageous features of high capacity, small size and safe storage, has gained great popularity. Consequently, disk drive, which may read CD or DVD, has become part of essential equipment of personal computers.

An optical disk drive at least includes an optical pickup head and a spindle motor, wherein the optical pickup head is for reading the data stored in an optical disk, while the spindle motor is for carrying and rotating the optical disk in high speeds. Partial structure of a conventional optical disk drive is disclosed in diagrams illustrated below.

Referring to FIG. 1A and FIG. 1B at the same time. FIG. 1A is a partial top view of a conventional optical disk drive, while FIG. 1B is a cross-sectional view of the optical disk drive along the cross-sectional line 1B–1B' illustrated in FIG. 1A. In FIG. 1A and FIG. 1B, optical disk drive 11 at least includes a spindle motor 10 for carrying and rotating an optical disk 19, wherein the spindle motor 10 further includes at least a motor base 12, a rotor 14, a rotating shaft 16 and a turntable 18. The rotating shaft 16 is rotatably disposed on the motor base 12. The rotor 14 having a rotor's top surface 14a is disposed on the rotating shaft 16 with part of the rotating shaft 16 protruding from the rotor's to surface 14a. The turntable 18, which is disposed on the top of the rotating shaft 16 for carrying the optical disk 19, includes a mounting portion 18a and a fitting portion 18b. The mounting portion 18a is connected to the rotating shaft 16 for carrying the optical disk 19. The fitting portion 18b is disposed on the mounting portion 18a to be buckled into the central fitting hole of the optical disk 19 for fixing the optical disk onto the turntable 18.

When the turntable 18 and the optical disk 19 are having synchronous rotation, the optical disk 19 will vibrate if the optical disk 19 has any structural faults (e.g., the optical disk 19 becomes loose when placed on the turntable 18) or if the optical disk drive 11 is hit by external forces. Under these circumstances, the optical pickup head disposed within the optical disk drive 11 will fail to read the data of the optical disk 19, causing in disk skipping problem to the optical disk drive 11.

SUMMARY OF THE INVENTION

It is therefore an object of the invention to provide an optical disk drive with a mounting structure for preventing disk vibrating. The design of using a steel ball to fasten the optical disk when the disk mounting structure vibrates prevents the optical disk from vibrating during rotation, avoiding failure in reading data stored at the optical disk and reducing disk skipping problem as well.

It is another object of the invention to provide a disk mounting structure disposed on the top of a spindle motor for preventing disk vibrating. The disk mounting structure includes a mounting portion, a fitting portion and a steel ball. The mounting portion is for carrying an optical disk; the fitting portion is disposed on the mounting portion to be buckled into a central fitting hole of the optical disk. The lateral surface of the fitting portion has a cavity. The steel ball is movably disposed inside the cavity and may be pulled or attracted by a predetermined pulling force. When the disk mounting structure rotates, part of the steel ball will be exposed outside the opening of the cavity to press and fasten the optical disk because the centrifugal force of the steel ball is larger than the predetermined pulling force. When the disk mounting structure halts rotating, the steel ball will be contained inside the cavity by the predetermined pulling force.

It is another object of the invention to provide an optical disk drive including a motor base, a rotating shaft, a rotor and a disk mounting structure. The rotating shaft is rotatably disposed on the motor base. The rotor having a top surface is disposed on the rotating shaft with part of the rotating shaft protruding from the rotor's top surface. The disk mounting structure includes a mounting portion, a fitting portion and a steel ball. The mounting portion is disposed on the top of the rotating shaft for carrying an optical disk. The fitting portion is disposed on the mounting portion to be buckled into the central fitting hole of the optical disk. The lateral surface of the fitting portion has a cavity. The steel ball is movably disposed inside the cavity and may be pulled or attracted by a predetermined pulling force. When the disk mounting structure rotates, part of the steel ball will be exposed outside the opening of the cavity to press and fasten the optical disk because the centrifugal force of the steel ball is larger than the predetermined pulling force. When the disk mounting structure halts rotating, the steel ball will be contained inside the cavity by the predetermined pulling force.

Other objects, features, and advantages of the invention will become apparent from the following detailed description of the preferred but non-limiting embodiments. The following description is made with reference to the accompanying drawings.

DETAILED DESCRIPTION OF THE INVENTION

PREFERRED EMBODIMENT ONE

Figure 1A:
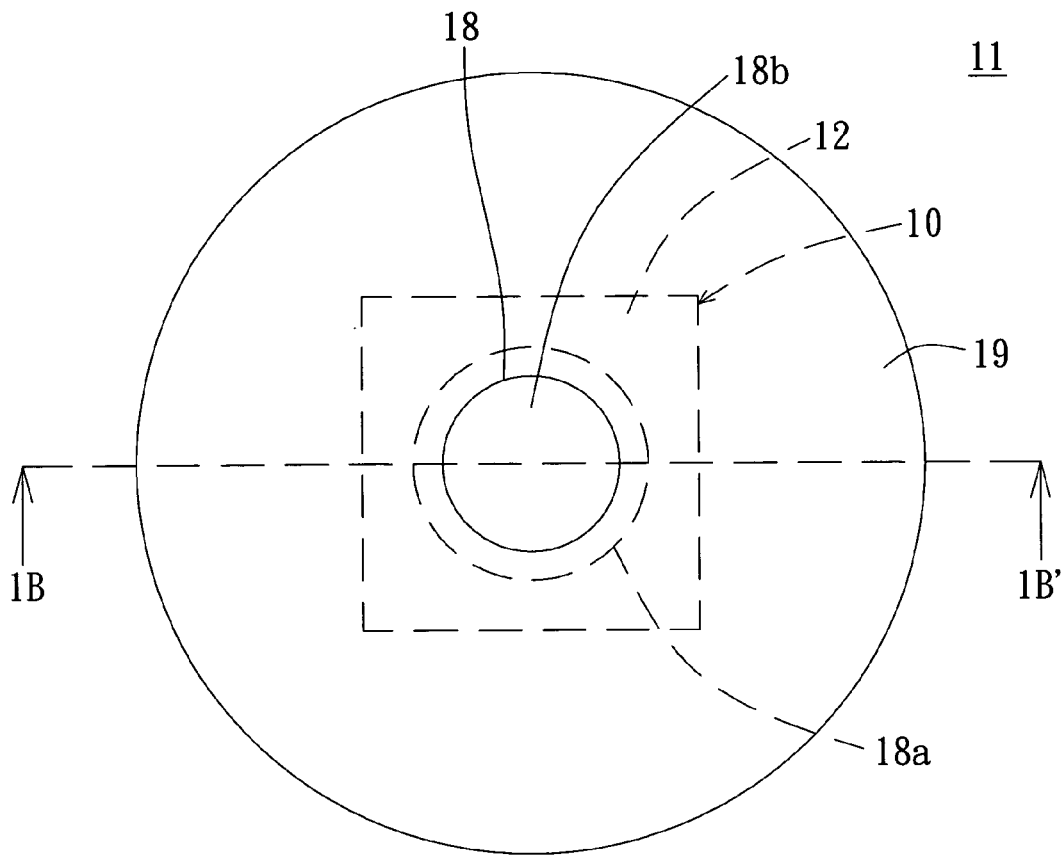
FIG. 1A (Prior Art) is a partial top view of a conventional optical disk drive.
Figure 1B:
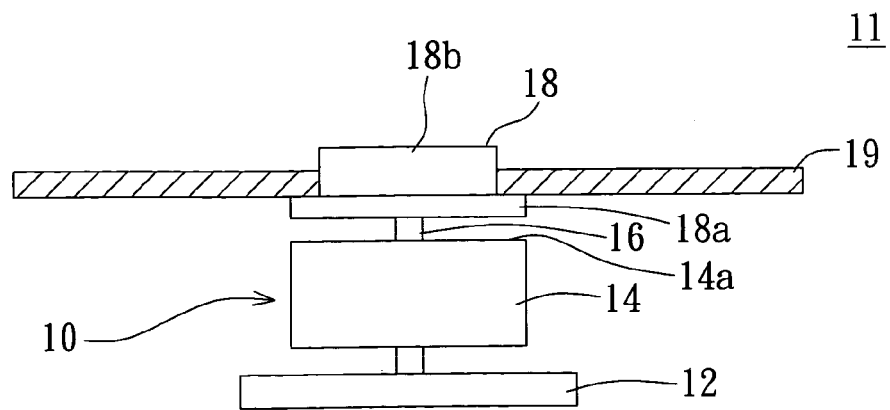
FIG. 1B (Prior Art) is a cross-sectional view of the optical disk drive along the cross-sectional line 1B–1B' illustrated in FIG. 1A.
Figure 2A:
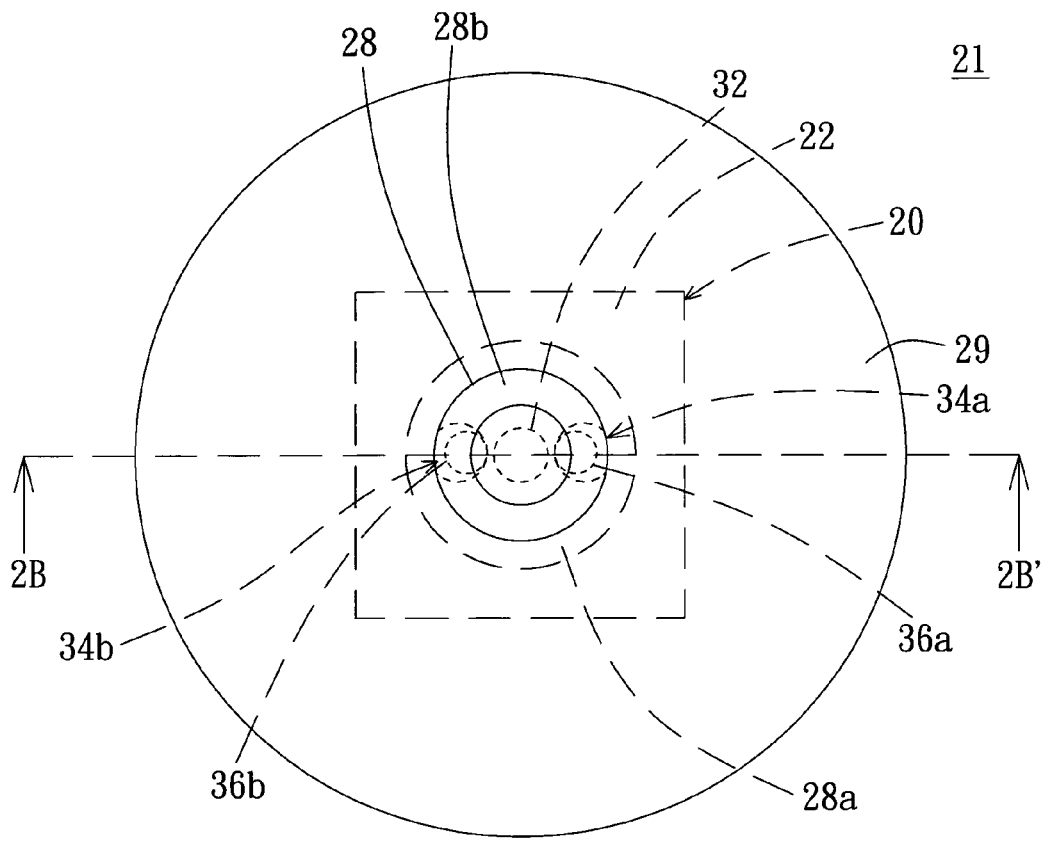
FIG. 2A is a partial top view of a optical disk drive having a disk mounting structure for preventing disk vibrating according to preferred embodiment one of the invention.
Figure 2B:
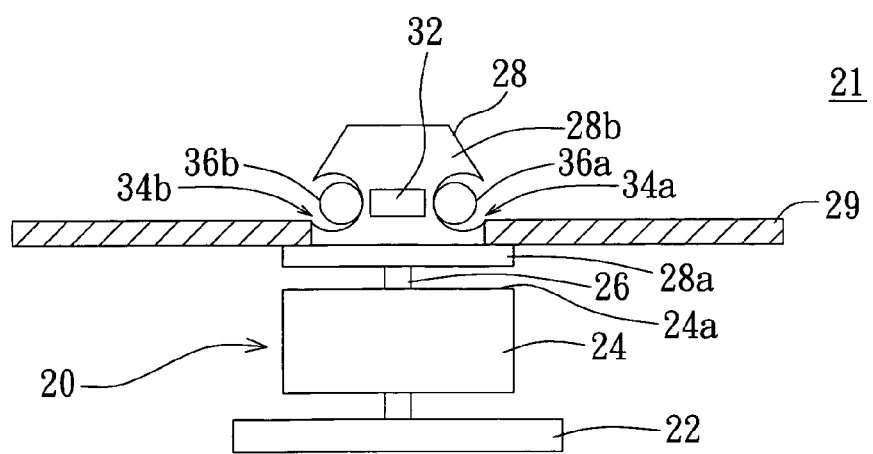
FIG. 2B is a cross-sectional view of the optical disk drive along the cross-sectional line 2B–2B' illustrated in FIG. 2A.

Referring to FIG. 2A and FIG. 2B at the same time. FIG. 2A is a partial top view of a optical disk drive having a disk mounting structure for preventing disk vibrating according to preferred embodiment one of the invention, while FIG. 2B is a cross-sectional view of the optical disk drive along the cross-sectional line 2B–2B' illustrated in FIG. 2A. In FIG. 2A and FIG. 2B, optical disk drive 21 at least includes a spindle motor 20 for carrying and rotating an optical disk 29, wherein the spindle motor 20 includes a motor base 22, a rotor 24, a rotating shaft 26 and a disk mounting structure 28. The rotating shaft 26 is rotatably disposed on the motor base 22. The rotor 24 having a top surface 24a is disposed on the rotating shaft 26 with part of the rotating shaft 26 protruding from the rotor's top surface 24a. The disk mounting structure 28 is disposed on the top of the rotating shaft 26 for carrying the optical disk 29.

The disk mounting structure 28, which is disposed on the top of the rotating shaft 26, includes a mounting portion 28a, a fitting portion 28b, a magnet 32 and at least a steel ball, say, steel balls 36a and 36b for instance. The mounting portion 28a is for carrying the optical disk 29; the fitting portion 28b is disposed on the mounting portion 28a to be buckled into the central fitting hole of the optical disk 29. The lateral surface of the fitting portion 28b has at least a cavity, say, cavities 34a and 34b for instance. Of which, the number of cavities corresponds to the number of steel balls. The steel balls 36a and 36b are movably disposed at the cavities 34a and 34b respectively. The magnet 32 is buried within the fitting portion 28b and situated between steel ball 36a and steel ball 36b. The magnetism of the magnet 32 serves as a predetermined pulling force to attract and hold the steel balls 36a and 36b for the disk mounting structure 28. It is noteworthy that the capacity of the cavity must be larger than the volume of the steel ball such that the steel ball can be movably contained within the cavity. Moreover, the area of the opening of the cavity must be smaller than the area of the maximum cross-section of the steel ball, lest the steel ball might be ejected from the cavity.

Figure 3A:
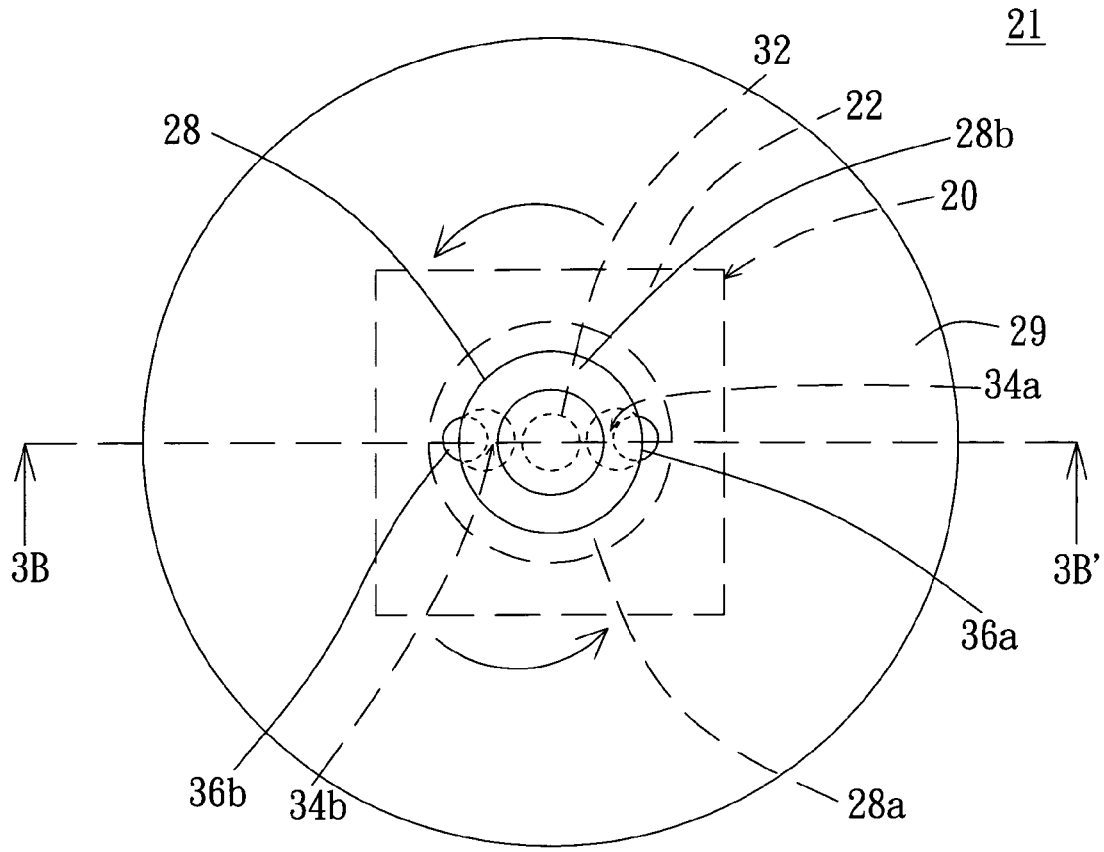
FIG. 3A is a top view showing the status when the spindle motor and disk in FIG. 2A are rotating.
Figure 3B:
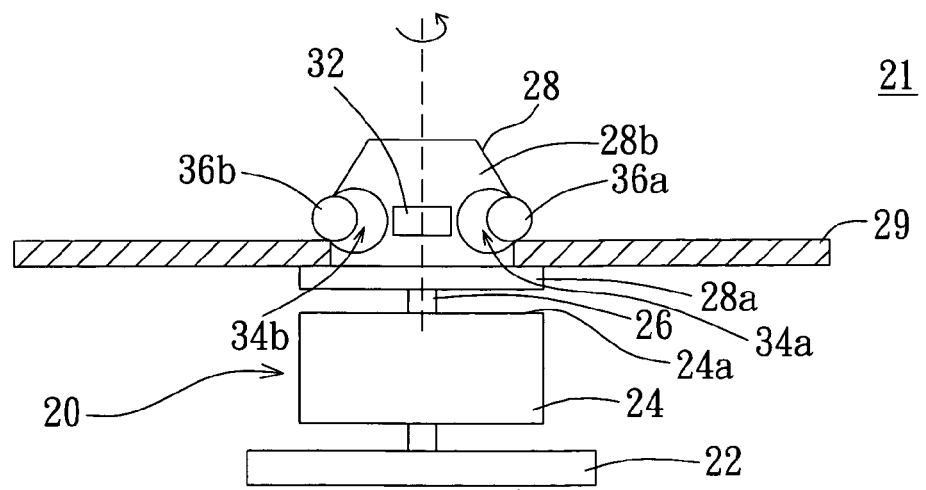
FIG. 3B is a cross-sectional view along the cross-sectional line 3B–3B' in FIG. 3A showing the status when the spindle motor and disk are rotating.

When the optical disk 29 is loaded onto or unloaded from the disk mounting structure 28, the steel ball 36a and the steel ball 36b will be respectively contained within the cavity 34a and the cavity 34b by the magnetism of the magnet 32. When the disk mounting structure 28 and the optical disk 29 rotate synchronously, the steel balls 36a and 36b, whose centrifugal force being larger than the magnetism of the magnet 32, will move outwardly and will be partly exposed outside the opening of cavities 34a and 34b to press and fasten the optical disk 29 as shown in FIG. 3A and FIG. 3B. It is noteworthy that the distance between the lowest point of the opening of cavities 34a and 34b and the top surface of the mounting portion 28a is slightly smaller than the thickness of the optical disk 29, such that the exposed part of the steel balls 36a and 36b outside the opening of cavities 34a and 34b may press and fasten the optical disk 29.

The faster the disk mounting structure 28 rotates, the larger centrifugal force the steel balls 36a and 36b will receive; the larger the contact surface exists between the optical disk 29 and the exposed part of the steel balls 36a and 36b outside the opening of cavities 34a and 34b, the heavier steel ball 36a and 36b will press and fasten the optical disk 29. This really helps to prevent the optical disk 29 from vibrating during rotation. When the disk mounting structure 28 and the optical disk 29 halt rotating, the steel ball 36a and the steel ball 36b will be contained within the cavity 34a and the cavity 34b respectively by the magnetism of the magnet 32 as shown in FIG. 2A and FIG. 2B.

PREFERRED EMBODIMENT TWO

Figure 4:
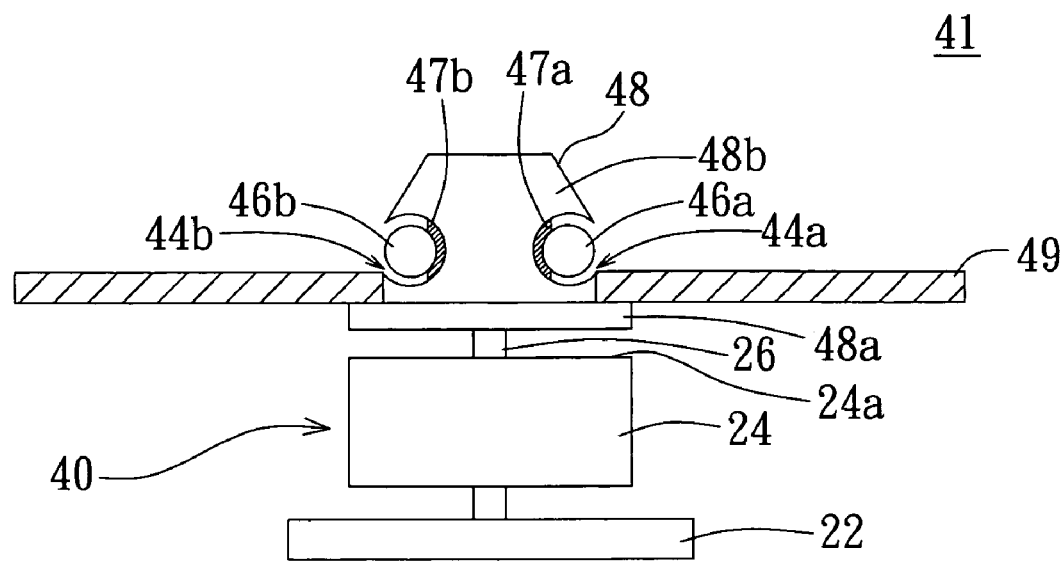
FIG. 4 is a partial sectional view of a optical disk drive having a disk mounting structure for preventing disk vibrating according to preferred embodiment two of the invention.

Referring to FIG. 4, a partial sectional view of an optical disk drive having a disk mounting structure for preventing disk vibrating according to preferred embodiment two of the invention. In FIG. 4, optical disk drive 41 at least includes a spindle motor 40 for carrying and rotating an optical disk 49. Of which, the only dissimilarity between the spindle motor 40 in the present preferred embodiment and the spindle motor 20 in the preferred embodiment one lies in the design of a disk mounting structure. The two spindle motors are similar otherwise and the similarities are not repeated here. Disk mounting structure 48, which is disposed on the top of the spindle motor 40, includes a mounting portion 48a, a fitting portion 48b, at least an elastic body, say, elastic bodies 47a and 47b for instance, and at least a steel ball, say, steel balls 46a and 46b for instance. The disk mounting structure 48a disposed on the top of the rotating shaft 26 is for carrying the optical disk 49; the fitting portion 48b is disposed on the mounting portion 48a to be buckled into the central fitting hole of the optical disk 49. The lateral surface of the fitting portion 48b has at least a cavity, say, cavities 44a and 44b for instance. Of which, the number of cavities corresponds to the number of steel balls. The steel ball 46a and the steel ball 46b are movably disposed inside the cavity 44a and the cavity 44b respectively. The elastic body 47a and the elastic body 47b are movably disposed inside the cavity 44a and the cavity 44b respectively for connecting the steel ball 46a to the bottom of the cavity 44a and for connecting the steel ball 46b to the bottom of the cavity 44b respectively. The elasticity of elastic bodies 47a and 47b serves as a predetermined pulling force to attract and hold the steel ball 46a and the steel ball 46b respectively. It is noteworthy that the capacity of the cavity must be larger than the volume of the steel ball such that the steel ball can be movably contained within the cavity. Moreover, the area of the opening of the cavity must be smaller than the area of the maximum cross-section of the steel ball, lest the steel ball might be ejected from the cavity.

Figure 5:
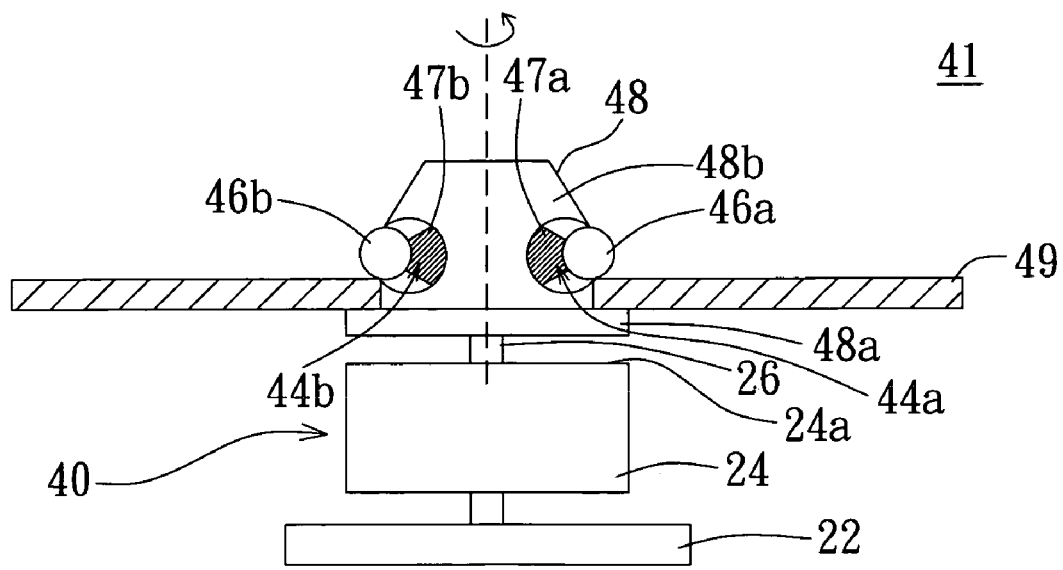
FIG. 5 is a sectional view showing the status when the spindle motor and the optical disk in FIG. 4 are rotating.

When the optical disk 49 is loaded onto or unloaded from the disk mounting structure 48, the steel ball 46a and the steel ball 46b will be respectively contained within the cavity 44a and the cavity 44b by the elasticity of elastic bodies 47a and 47b. When the disk mounting structure 48 and the optical disk 49 rotate synchronously, the steel balls 46a and 46b, whose centrifugal force being larger than the elasticity of elastic bodies 47a and 47b, will move outwardly and will be partly exposed outside the opening of cavities 44a and 44b to press and fasten the optical disk 49 as shown in FIG. 5. It is noteworthy that the distance between the lowest point of the opening of cavities 44a and 44b and the top surface of the mounting portion 48a is slightly smaller than the thickness of the optical disk 49, such that the exposed part of the steel balls 46a and 46b outside the opening of the cavities 44a and 44b may press and fasten the optical disk 49.

The faster the disk mounting structure 48 rotates, the larger centrifugal force the steel balls 46a and 46b will receive; the larger the contact surface exists between the optical disk 49 and the exposed part of the steel balls 46a and 46b outside the opening of the cavities 44a and 44b, the heavier the steel ball 46a and 46b will press and fasten the optical disk 49. This really helps to prevent the optical disk 49 from vibrating during rotation. When the disk mounting structure 48 and the optical disk 49 halt rotating, the steel ball 46a and the steel ball 46b will be contained within the cavity 44a and the cavity 44b respectively by the elasticity of elastic bodies 47a and 47b as shown in FIG. 4.

The optical disk drive having a disk mounting structure for preventing disk vibrating disclosed in the above preferred embodiments of the invention whose design of using a steel ball to fasten the optical disk when the disk mounting structure vibrates prevents the optical disk from vibrating during rotation, avoiding failure in reading data stored at the optical disk and reducing disk skipping problem as well.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A disk mounting structure, disposed on the top of a spindle motor, comprising at least:
    a mounting portion for carrying an optical disk;
    a fitting portion disposed on the mounting portion to be buckled into a central fitting hole of the optical disk, wherein the lateral surface of the fitting portion has at least a cavity; and
    a ball, which is movably disposed inside the cavity, pulled or attracted by a predetermined pulling force;
    wherein when the disk mounting structure rotates, part of the ball will be exposed outside the opening of the cavity to press and fasten the optical disk because the centrifugal force of the steel ball is larger than the predetermined pulling force; and
    when the disk mounting structure halts rotating, the ball will be contained inside the cavity by the predetermined pulling force.

2. The disk mounting structure according to claim 1, wherein the disk mounting structure further comprises:
    a magnet buried within the fitting portion for providing the predetermined pulling force.

3. The disk mounting structure according to claim 1, wherein the disk mounting structure further comprises:
    an elastic body disposed inside the cavity for connecting the ball to the bottom of the cavity and providing the predetermined pulling force.

4. The disk mounting structure according to claim 1, wherein the area of the opening of the cavity is substantially smaller than the area of the maximum cross-section of the ball.

5. The disk mounting structure according to claim 1, wherein the distance between the lowest point of the opening of the cavity and the top surface of the mounting portion is substantially smaller than the thickness of the optical disk.

6. The disk mounting structure according to claim 1, wherein the capacity of the cavity is substantially larger than the volume of the ball.

7. The disk mounting structure according to claim 1, wherein the spindle motor further comprises:
    a motor base;
    a rotating shaft which is rotatably disposed on the motor base; and
    a rotor, which has a top surface and is disposed on the rotating shaft with part of the rotating shaft protruding from the rotor's top surface, wherein the disk mounting structure is disposed on the top of the rotating shaft.

8. An optical disk drive having a disk mounting structure, comprising:
    a motor base;
    a rotating shaft, which is rotatably disposed on the motor base;
    a rotor, which has a top surface and is disposed on the rotating shaft with part of the rotating shaft protruding from the rotor's top surface; and
    a disk mounting structure further comprises:
        a mounting portion disposed on the top of the rotating shaft for carrying an optical disk;
        a fitting portion disposed on the mounting portion to be buckled into a central fitting hole of the optical disk, wherein the lateral surface of the fitting portion has a cavity; and
        a ball, which is movably disposed inside the cavity, pulled or attracted by a predetermined pulling force;
    wherein when the disk mounting structure rotates, part of the ball will be exposed outside the opening of the cavity to press and fasten the optical disk because the centrifugal force of the steel ball is larger than the predetermined pulling force; and
    when the disk mounting structure halts rotating, the ball will be contained inside the cavity by the predetermined pulling force.

9. The optical disk drive according to claim 8, wherein the disk mounting structure further comprises:
    a magnet buried within the fitting portion for providing the predetermined pulling force.

10. The optical disk drive according to claim 8, wherein the disk mounting structure further comprises:
    an elastic body disposed inside the cavity for connecting the ball to the bottom of the cavity and for providing the predetermined pulling force.

11. The optical disk drive according to claim 8, wherein the area of the opening of the cavity is substantially smaller than the area of the maximum cross-section of the ball.

12. The optical disk drive according to claim 8, wherein the distance between the lowest point of the opening of the cavity and the top surface of the mounting portion is substantially smaller than the thickness of the optical disk.

13. The optical disk drive according to claim 8, wherein the capacity of the cavity is substantially larger than the volume of the ball.

* * * * *